(12) United States Patent
Bitonneau et al.

(10) Patent No.: US 12,246,433 B2
(45) Date of Patent: Mar. 11, 2025

(54) DEVICE AND METHOD FOR FINISHING A SOLID-PROPELLANT CHARGE

(71) Applicant: ARIANEGROUP SAS, Paris (FR)

(72) Inventors: David Bitonneau, Le Haillan (FR); Théo Moulieres-Seban, Le Haillan (FR); Simon Kamatchy, Le Haillan (FR)

(73) Assignee: ARIANEGROUP SAS, Paris (FR)

( * ) Notice: Subject to any disclaimer, the term of this patent is extended or adjusted under 35 U.S.C. 154(b) by 613 days.

(21) Appl. No.: 17/598,630

(22) PCT Filed: Mar. 20, 2020

(86) PCT No.: PCT/FR2020/050612
§ 371 (c)(1),
(2) Date: Sep. 27, 2021

(87) PCT Pub. No.: WO2020/193926
PCT Pub. Date: Oct. 1, 2020

(65) Prior Publication Data
US 2022/0161440 A1     May 26, 2022

(30) Foreign Application Priority Data

Mar. 28, 2019 (FR) ...................................... 1903268

(51) Int. Cl.
*B25J 11/00*         (2006.01)
*B25J 9/16*           (2006.01)
(Continued)

(52) U.S. Cl.
CPC ........... *B25J 11/005* (2013.01); *B25J 9/1633* (2013.01); *B25J 9/1651* (2013.01); *B25J 9/1689* (2013.01);
(Continued)

(58) Field of Classification Search
CPC ......... B25J 11/00; B25J 11/005; B25J 11/006; B25J 9/1633; B25J 9/1651; B25J 9/1656;
(Continued)

(56) References Cited

U.S. PATENT DOCUMENTS 3,136,831 A * 6/1964 Zinn ................... C06B 21/0058
264/225
3,183,592 A    5/1965 Manning
(Continued)

OTHER PUBLICATIONS

NASA, Assessment and Control of Electrostatic Charges, May 1974, NASA SP-8111 (Year: 1974).*
(Continued)

*Primary Examiner* — Russell Frejd
*Assistant Examiner* — Sara J Lewandroski
(74) *Attorney, Agent, or Firm* — Pillsbury Winthrop Shaw Pittman LLP

(57) ABSTRACT

A process for removing webs formed on a wall of a central channel of a propellant charge, the process including removing webs by levelling the wall of the central channel of the propellant charge with a levelling tool installed on an articulated robotic arm during which the movements of the robot arm are controlled by a user interface which includes a controller configured to be used by a user; a force sensor measures the force applied by the levelling tool; a control unit connected to the force sensor regulates the movements of the robot arm by maintaining the force applied by the levelling tool below a first predetermined force threshold, the control unit also regulating the movements of the robot arm by maintaining a movement speed of the levelling tool which is below a predetermined speed threshold value.

12 Claims, 2 Drawing Sheets

(51) Int. Cl.
*B25J 13/08* (2006.01)
*B25J 15/00* (2006.01)
*B25J 19/04* (2006.01)
*F02K 9/10* (2006.01)
*F02K 9/24* (2006.01)

(52) U.S. Cl.
CPC ......... *B25J 13/085* (2013.01); *B25J 15/0019* (2013.01); *B25J 19/04* (2013.01); *F02K 9/10* (2013.01); *F02K 9/24* (2013.01)

(58) Field of Classification Search
CPC ...... B25J 9/1669; B25J 9/1689; B25J 9/1694; B25J 9/1697; B25J 13/06; B25J 13/065; B25J 13/08; B25J 13/081; B25J 13/082; B25J 13/084; B25J 13/085; B25J 13/087; B25J 13/088; B25J 13/089; B25J 15/0019; B25J 19/02; B25J 19/021; B25J 19/023; B25J 19/028; B25J 19/04; F02K 9/00; F02K 9/08; F02K 9/10; F02K 9/12; F02K 9/14; F02K 9/16; F02K 9/18; F02K 9/20; F02K 9/22; F02K 9/24; F02K 9/26; F02K 9/28; F02K 9/30; F02K 9/32; F02K 9/34; F02K 9/343; F02K 9/346; F02K 9/36; F02K 9/38; F02K 9/40; F02K 9/70; F02K 9/72

See application file for complete search history.

(56) References Cited

U.S. PATENT DOCUMENTS

| | | | |
|---|---|---|---|
| 3,326,086 | A | 6/1967 | Whitehill |
| 4,218,941 | A | 8/1980 | David-Malig |
| 4,462,286 | A | 7/1984 | Erhard |
| 5,391,025 | A * | 2/1995 | Hoekstra .............. F02K 9/24 409/199 |
| 2011/0270444 | A1 | 11/2011 | Nagata et al. |
| 2014/0277720 | A1 | 9/2014 | Izumi et al. |
| 2015/0298318 | A1 * | 10/2015 | Wang ................ B25J 9/1689 700/257 |
| 2016/0214143 | A1 | 7/2016 | Nagatsuka |
| 2018/0154518 | A1 | 6/2018 | Rossano et al. |

OTHER PUBLICATIONS

International Search Report as issued in International Patent Application No. PCT/FR2020/050612, dated Sep. 15, 2020.

* cited by examiner

[Fig. 1]

DEVICE AND METHOD FOR FINISHING A SOLID-PROPELLANT CHARGE

CROSS-REFERENCE TO RELATED APPLICATIONS

This application is the U.S. National Stage of PCT/FR2020/050612, filed Mar. 20, 2020, which in turn claims priority to French patent application number 1903268 filed Mar. 28, 2019. The content of these applications are incorporated herein by reference in their entireties.

TECHNICAL FIELD

The present invention relates to the general field of manufacturing a propellant charge.

PRIOR ART

Currently, a propellant charge is obtained by casting a propellant paste into a structure within which a core has been installed in order to give the desired shape to the propellant charge.

Once the propellant has solidified, the core is removed.

A defect that is often encountered during the manufacture of a propellant charge is the appearance of propellant webs, which are excess propellant that has formed due to gaps between the various elements of the core, and which can be deposited on the inner wall of the central channel of the propellant charge when the core is removed.

These propellant webs must be removed from the propellant charge in order to ensure that the charge has the desired characteristics.

Currently, this removal step is performed by operators who manually scrape the inner wall of the central channel of the propellant charge with tools in order to remove the webs.

However, such a removal step faces safety problems, exposing operators in particular to a pyrotechnical risk.

DISCLOSURE OF THE INVENTION

The principal aim of the present invention is therefore to provide a solution for ensuring safe removal of propellant webs from a propellant charge.

According to a first aspect, the invention relates to a process for removing webs formed on a wall of a central channel of a propellant charge, characterized in that the process comprises a step of removing webs by levelling the wall of the central channel of the propellant charge with a levelling tool installed on an articulated robot arm during which:
  the movements of the robot arm are controlled by a user interface which comprises control means configured to be used by a user;
  a force sensor measures the force applied by the levelling tool;
  a control unit connected to the force sensor regulates the movements of the robot arm by maintaining the force applied by the central levelling tool below a first predetermined force threshold, the control unit also regulating the movements of the robot arm by maintaining a movement speed of the levelling tool which is below a predetermined speed threshold value.

Such a process offers the advantage of providing good control of the levelling tool by a user and limits the risk of damage to the propellant charge.

According to a possible feature, the process comprises a probing step performed before the step of removing the webs and during which:
  the levelling tool is moved along the wall of the central channel of the propellant charge by the robot arm;
  the movements of the robot arm are controlled by the user interface;
  the force sensor measures the force applied by the levelling tool;
  the control unit regulates the movements of the robot arm by maintaining the force applied by the levelling tool below a second predetermined force threshold which is lower than the first force threshold.

According to a possible feature, the first force threshold varies between a minimum value and a maximum value which are predetermined.

According to a possible feature, the speed threshold value varies between a minimum value and a maximum value which are predetermined.

According to a possible feature, the step of removing the webs comprises the following substeps:
  placing the levelling tool against a web;
  pressing the levelling tool against the web by progressively increasing the force applied by the levelling tool against the web and by progressively increasing the first force threshold until the web is detached.

According to a possible feature, the control unit regulates the movements of the robot arm by keeping the kinetic energy of the robot arm below a predetermined kinetic energy threshold value.

According to a second aspect, the invention relates to a device for removing webs formed on a wall of a central channel of a propellant charge comprising:
  an articulated robot arm comprising an end configured to penetrate into the central channel of the propellant charge;
  a levelling tool which is configured to be attached to the end of the robot arm;
  a force sensor which is configured to be attached to the end of the robot arm and which is configured to measure the force applied by the robot arm;
  a user interface comprising control means which are configured to allow control of the movements of the robot arm by a user;
  a control unit which is connected to the robot arm and to the force sensor, said control unit being configured to regulate the movements of the robot arm by maintaining the force applied by the robot arm below a first predetermined force threshold, said control unit being further configured to regulate the movements of the robot arm by maintaining a movement speed of the end of the robot arm which is below a predetermined speed threshold value.

According to a possible feature, the levelling tool is made of an electrically conductive material and is connected to electrical ground.

According to a possible feature, the device comprises at least one image sensor which is configured to be attached to the end of the robot arm, and the user interface comprises a display which is configured to display images acquired by said least one image sensor.

According to a possible feature, the device comprises a lighting system which is configured to be attached to the end of the robot arm.

According to a possible feature, the device comprises a suction nozzle which is configured to be attached to the end of the robot arm.

BRIEF DESCRIPTION OF THE DRAWINGS

Other features and advantages of the present invention will emerge from the description below, with reference to the appended drawings which illustrate a non-limiting example embodiment thereof.

DESCRIPTION OF THE EMBODIMENTS

Figure 1:
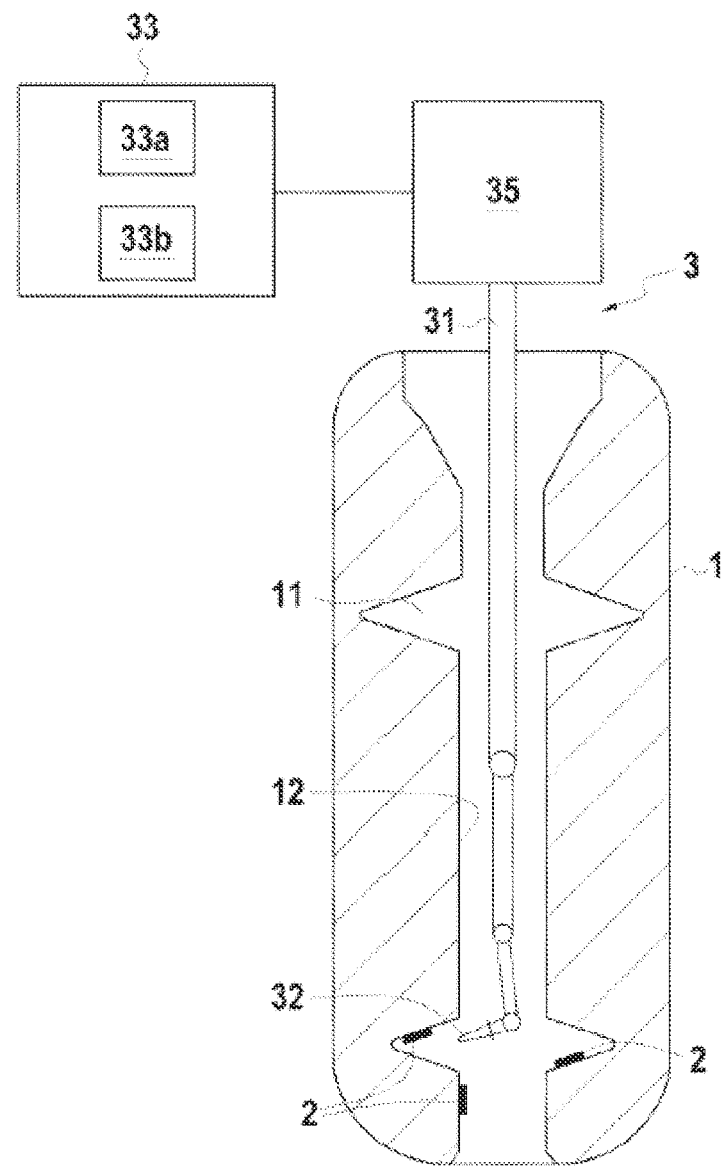
FIG. 1 shows schematically a device for removing webs formed on a wall of a central channel of a propellant charge.

As shown in FIG. 1, a propellant charge 1 comprises a central channel 11.

Webs 2 may be located on the wall 12 of the central channel 11 of the propellant charge 1. The webs 2 may be formed by propellant overspray or propellant chips that have settled on the wall 12 of the central channel 11.

A device 3 for removing the webs 2 comprises an articulated robot arm 31 which comprises an end 31a to which a levelling tool 32 is attached in order to level the wall 12 of the central channel 11 and thus remove the webs 2. The levelling of the wall 12 of the central channel 11 levels said wall 12, thus eliminating the propellant over thicknesses and loosening the propellant chips stuck to the wall 12.

As seen in FIG. 1, the robot arm 31 is configured to insert the end 31a, and thus the levelling tool 32, inside the central channel 11. Thus, the robot arm 31 may comprise a plurality of pivot connections and comprise one or more telescopic portions.

The movements of the robot arm 31 are controlled by control means 33a of a user interface 33, thus allowing an operator to control the movements of the robot arm 31 via the user interface 33.

According to a non-limiting example, the control means 33a are formed by a joystick, or by a three-dimensional (3D) mouse.

The use of the robot arm 31 avoids exposing the operator to the pyrotechnical risk of handling the propellant charge 1.

Figure 2:
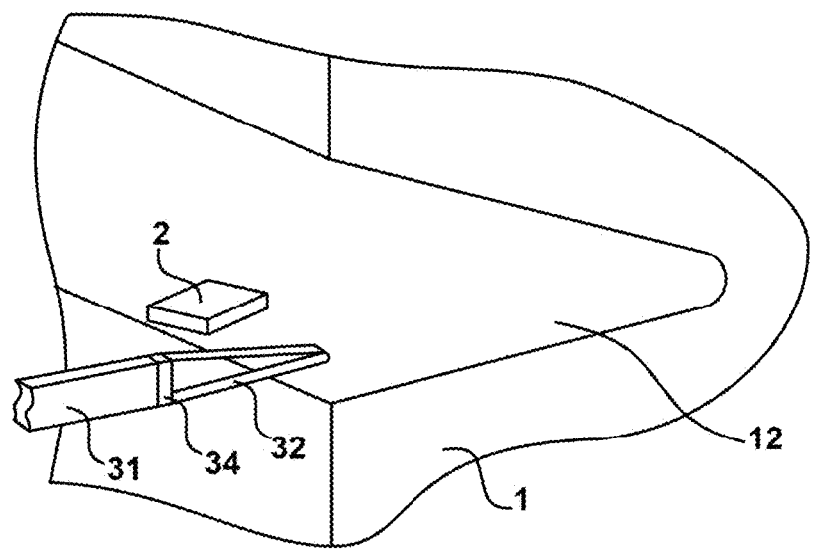
FIG. 2 shows schematically the end of the robot arm on which a levelling tool is installed, which is located in the central channel of the propellant charge.

Furthermore, as can be seen in FIG. 2, a force sensor 34 is installed on the end 31a of the robot arm 31 in order to measure the force applied by the levelling tool 32 against the propellant charge 1. The force sensor 34 thus allows the force applied by the levelling tool 32 against the wall 12 or against the web 2 to be measured.

As can be seen in FIG. 2, the levelling tool 32 may be formed by a blade, for example a V-shaped blade. The blade may, for example, be slid beneath the webs 2 in order to detach said webs 2 from the wall 12 of the central channel 11.

According to an advantageous variant, the levelling tool 32 is made of an electrically conductive material, such as metal, and is connected to electrical ground, thus limiting the risk of ignition of the propellant charge 1 by static electricity.

The device 3 also comprises a control unit 35 which regulates the movements of the robot arm 31 controlled by the control means 33a of the user interface 33.

The control unit 35 is connected to the force sensor 34 and regulates the movements of the levelling tool 32 by regulating the force applied by the levelling tool 32 on the propellant charge 1.

Furthermore, the control unit 35 regulates the movements of the robot arm 31 by regulating the movement speed of the levelling tool 32.

The movement speed of the levelling tool 32 may be calculated by the control unit 35 from the movements of the various servo motors of the robot arm 31. The movement speed of the levelling tool 32 may also be obtained by an acceleration sensor which is attached to the end 31a of the robot arm 31, said acceleration sensor being connected to the control unit 35.

At least one image sensor 36 may also be installed on the end 31a of the robot arm 31 so as to acquire images of the surface 12 of the central channel 11 and of the levelling tool 32.

The user interface 33 may comprise a display 33b that is connected to said at least one image sensor 36, thereby enabling images acquired by said at least one image sensor 36 to be displayed to the operator.

In association with the at least one image sensor 36, the device 3 may comprise a lighting system that is configured to be attached to the end 31a of the robot arm 31 and that illuminates the interior of the central channel 11. According to an advantageous feature, the lighting system comprises several light sources, thereby allowing shadows to disappear or appear on the surface 12 of the central channel 11 in order to better appreciate the shape of the web 2 illuminated by the lighting system. The light sources may, for example, be formed by lamps.

Furthermore, the display 33b may also be used to display the force applied by the levelling tool 32, as well as the movement speed of said levelling tool 32.

The device 3 may also comprise a suction nozzle that is configured to be attached to the end 31a of the robot arm 31, so as to suck up the propellant fragments detached during the removal of the webs 2, thus allowing the surface 12 of the central channel 11 to be left clean at the end of the removal of the webs 2. The device 3 may comprise a discharge pipe which is connected to a tank in order to discharge the propellant fragments sucked up by the suction nozzle. According to a possible variant, the suction nozzle is integrated with the levelling tool 32.

The control unit 35 is configured to implement a process for removing the webs 2 formed on the wall 12 of the central channel 11 of the propellant charge 1.

Figure 3:
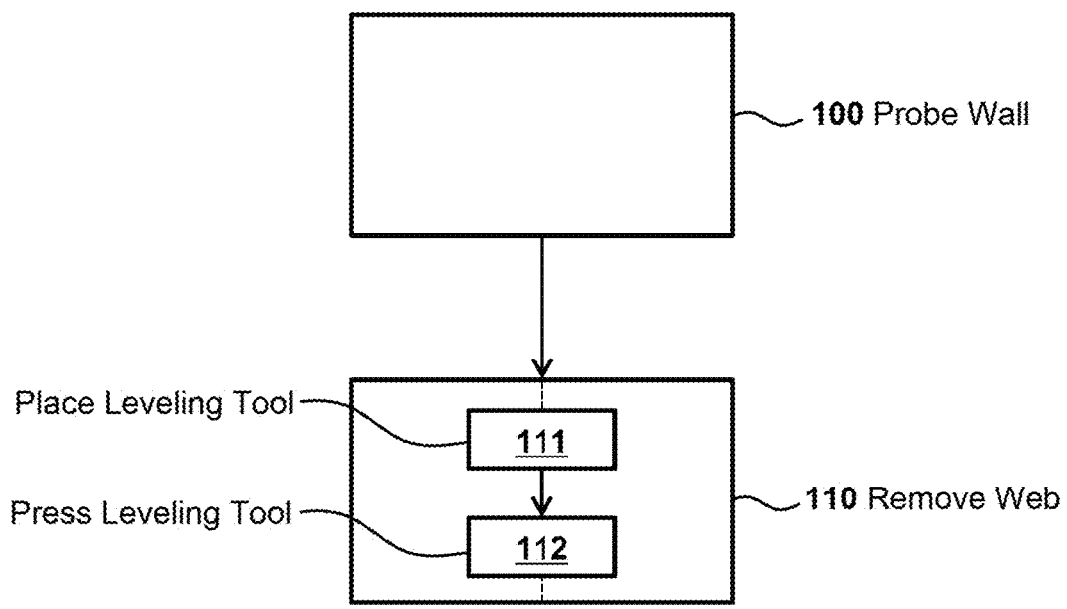
FIG. 3 shows schematically the steps of a process for removing webs formed on a wall of a central channel of a propellant charge.

As shown in FIG. 3, the process comprises a step 110 of removing the webs 2 by levelling the wall 12 of the central channel 11 with the levelling tool 32 which is installed on the robot arm 31. The levelling of the wall 12 is performed by levelling the wall 12 by removing the webs 2, the levelling of the wall 12 being carried out with the levelling tool 32 by detaching the webs 2, or by breaking the webs 2 with the levelling tool 32 if the webs 2 are rigid.

In this step 110 of removing the webs 2 by levelling the wall 12, the movements of the robot arm 31 are controlled by the user interface 33, the user choosing the movements performed by the levelling tool 32 via the control means 33a of the user interface 33. The movements of the levelling tool 32 may comprise moving the levelling tool 32 along the wall 12, pressing the levelling tool 32 against the webs 2, or rotating the levelling tool 32 to detach or break the webs 2.

Furthermore, in this step 110 of removing the webs 2 by levelling the wall 12, the control unit 35 regulates the movements of the robot arm 31 by maintaining the force applied by the levelling tool 32 below a first predetermined force threshold, the force applied being measured by the force sensor 34 during step 110.

The fact of limiting the force applied by the levelling tool 32 to below the first force threshold allows for removal of the webs, while limiting the risk of damage to the propellant charge 1. The first force threshold may, for example, be comprised between 30 and 100 N. The tangential force to the surface applied to the web 2 by the levelling tool 32 may, for example, be comprised between 30 and 100 N.

Furthermore, during the step 110 of removing the webs 2 by levelling the wall 12, the control unit 35 also regulates the movements of the robot arm 31 by maintaining the movement speed of the levelling tool 32 below a predetermined speed value.

The fact of limiting the movement speed of the levelling tool 32 below the predetermined speed value during the step 110 of levelling the wall 12 limits the risk of igniting the propellant charge 1. The speed threshold value may, for example, be comprised between 0.38 cm/s and 0.5 cm/s.

The first force threshold may be variable during the step 110 of removing the webs 2, said first force threshold varying between a minimum value and a maximum value which are predetermined. Thus, the user may increase the force applied by the levelling tool 2 to yield the web against which the levelling tool 2 presses, the force not being able to exceed the maximum value in order not to damage the propellant charge 1.

The speed threshold value may be variable during the step 110 of removing the webs 2, the speed threshold value varying between a minimum value and a maximum value. Such a variation of the speed threshold value makes it possible, on the one hand, to limit the risks during delicate operations performed by the levelling tool, and on the other hand, to accelerate the levelling tool 32 when said levelling tool 32 is not in contact with the propellant charge 1.

Furthermore, as shown in FIG. 3, the step 110 of removing the webs 2 may comprise the following substeps:
  substep 111: placing the levelling tool 32 against a web 2;
  substep 112: pressing the levelling tool 32 against the web 2 by progressively increasing the force applied by the levelling tool against the web 2 and progressively increasing the first force threshold until the web 2 is detached.

As shown in FIG. 3, the process may comprise a step 100 of probing the wall 12 which allows the detection of the webs 2 and which is performed prior to the step 110 of removing the webs 2.

During the probing step 100, the levelling tool 32 is moved along the wall 12 of the central channel 11 of the propellant charge 1 in order to detect the presence of a web 2 when the levelling tool 32 abuts against a web 2, the movements of the levelling tool 32 by the robot arm 31 are controlled by the user interface 33.

During the probing step 100, the control unit 35 regulates the movements of the robot arm 31 by keeping the force applied by the levelling tool 32 below a second predetermined force threshold which is lower than the first force threshold, the force sensor 34 measuring the force applied by the levelling tool 32 during the step 100.

The fact of limiting the force applied by the levelling tool 32 below the second force threshold which is lower than the first force threshold allows the presence and position of a web 2 to be detected when the levelling tool 32 abuts against a web 2 and is unable to advance farther, the force applied by the levelling tool 32 against the web 2 being too low to remove said web 2. The second force threshold may, for example, be comprised between 0.5 N and 5 N, the second force threshold may for example be equal to 1 N.

Once a web 2 is detected in step 100, step 110 of removing the web 2 by levelling is implemented, in particular by increasing the force applied by the levelling tool 32.

The probing step 100 allows a prepositioning of the levelling tool 32 against the web 2 before the step 110 of removing said web 2 is implemented.

The movement speed of the levelling tool 32 during the probing step 100 may be greater than the threshold speed value established for the step 110 of removing the webs 2.

According to a possible variant for limiting the risk of igniting the propellant charge 1, during the process for removing the webs 2, the control unit 35 regulates the movements of the robot arm by maintaining the kinetic energy of the robot arm below a predetermined kinetic energy threshold value. To this end, during each movement performed by the robot arm 31, the control unit 35 takes into account the mass of the part of the robot arm 31 that is set in motion in order to adapt the speed of the part of the robot arm 31 that is set in motion. Thus, a movement of the robot arm 31 in which a large part of the robot arm 31 is set in motion is performed at a low speed, thus limiting the kinetic energy of the robot arm 31, whereas a setting in motion of only the levelling tool 32 can be performed at a higher speed.

The invention claimed is:

1. A process for removing webs formed on a wall of a central channel of a propellant charge, the process comprising:
  removing webs by levelling the wall of the central channel of the propellant charge with a levelling tool installed on an articulated robot arm
  wherein the process further comprises placing the levelling tool against a web; and
  pressing the levelling tool against the web by progressively increasing the force applied by the levelling tool against the web and by progressively increasing the first force threshold until the web is detached during which:
  movements of the robot arm are controlled by a user interface which comprises a controller configured to be used by a user;
  a force sensor measures a force applied by the levelling tool;
  a control unit connected to the force sensor regulates the movements of the robot arm by maintaining the force applied by the levelling tool below a first predetermined force threshold, the control unit also regulating the movements of the robot arm by maintaining a movement speed of the levelling tool which is below a predetermined speed threshold value.

2. The process as claimed in claim 1, wherein the control unit regulates the movements of the robot arm by keeping the kinetic energy of the robot arm below a predetermined kinetic energy threshold value.

3. The process as claimed in claim 1, wherein the first force threshold varies between a minimum value and a maximum value which are predetermined.

4. The process as claimed in claim 1, wherein the speed threshold value varies between a minimum value and a maximum value which are predetermined.

5. A process for removing webs formed on a wall of a central channel of a propellant charge, the process comprising removing webs by levelling the wall of the central channel of the propellant charge with a levelling tool installed on an articulated robot arm during which:
  movements of the robot arm are controlled by a user interface which comprises a controller configured to be used by a user;

a force sensor measures a force applied by the levelling tool;

a control unit connected to the force sensor regulates the movements of the robot arm by maintaining the force applied by the levelling tool below a first predetermined force threshold, the control unit also regulating the movements of the robot arm by maintaining a movement speed of the levelling tool which is below a predetermined speed threshold value, wherein the process comprises a probing step performed before the removing of the webs and during which:

the levelling tool is moved along the wall of the central channel of the propellant charge by the robot arm;

the movements of the robot arm are controlled by the user interface;

the force sensor measures the force applied by the levelling tool;

the control unit regulates the movements of the robot arm by maintaining the force applied by the levelling tool below a second predetermined force threshold which is lower than the first force threshold.

6. A device for removing webs formed on a wall of a central channel of a propellant charge comprising:

an articulated robot arm comprising an end configured to penetrate into the central channel of the propellant charge;

a levelling tool which is configured to be attached to the end of the robot arm a force sensor which is configured to be attached to the end of the robot arm and which is configured to measure the force applied by the robot arm a user interface comprising a controller which are configured to allow control of the movements of the robot arm by a user;

a control unit which is connected to the robot arm and to the force sensor, said control unit being configured to regulate the movements of the robot arm by maintaining the force applied by the robot arm below a first predetermined force threshold, said control unit being further configured to regulate the movements of the robot arm by maintaining a movement speed of the end of the robot arm which is below a predetermined speed threshold value and to place the levelling tool against a web, and press the levelling tool against the web by progressively increasing the force applied by the levelling tool against the web and by progressively increasing the first predetermined force threshold until the web is detached.

7. The device as claimed in claim 6, wherein the force threshold is selected not to damage the wall of the central channel.

8. The device as claimed in claim 6, wherein the levelling tool is made of an electrically conductive material and is connected to electrical ground.

9. The device as claimed in claim 6, wherein the device comprises at least one image sensor which is configured to be attached to the end of the robot arm, and the user interface comprises a display which is configured to display images acquired by said least one image sensor.

10. The device as claimed in claim 9, wherein the device comprises a lighting system which is configured to be attached to the end of the robot arm.

11. The device as claimed in claim 6, wherein the device comprises a suction nozzle which is configured to be attached to the end of the robot arm.

12. The device as claimed in claim 6, wherein the control unit is further configured to place the levelling tool against a web, press the levelling tool against the web by progressively increasing the force applied by the levelling tool against the web and by progressively increasing the first force threshold until the web is detached.

* * * * *